May 19, 1964    N. RICKLESS ETAL    3,133,983
SYMMETRICAL TYPE OF PROJECTION OBJECTIVE
Filed June 27, 1962

FIG. 1

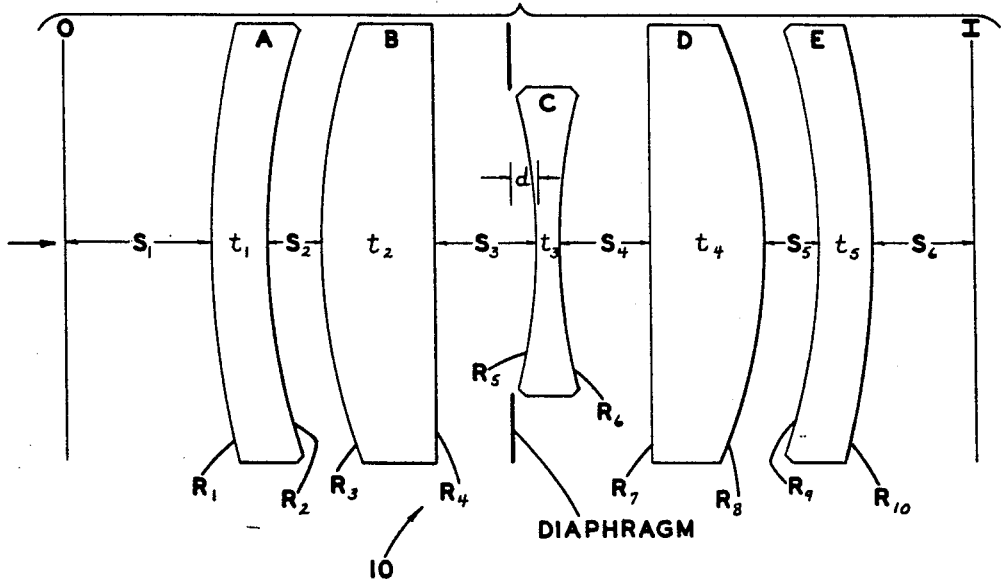

FIG. 2

| F.L. = 20" = 509.9 mm | | f/8.0 | | | |
|---|---|---|---|---|---|
| LENS | RADII | THICKNESSES | SPACINGS | $n_D$ | $\nu$ | FOCAL LENGTHS |
| A | $R_1$ = 212.81 | $t_1$ = 9.5 | $S_1$ = {991.9 at .95X, 1183.6 at .70X, 1588.3 at .45X} | 1.617 | 38.5 | $F_A$ = −559.66 |
| | $R_2$ = 129.42 | | | | | |
| B | $R_3$ = 115.88 | $t_2$ = 22.0 | | 1.700 | 48.0 | $F_B$ = +165.54 |
| | $R_4$ = ∞ | | $S_2$ = 10.5 | | | |
| C | $R_5$ = −167.49 | $t_3$ = 4.9 | $S_3$ = 18.5   d = 3.5 | 1.605 | 38.0 | $F_C$ = −137.66 |
| | $R_6$ = +167.49 | | $S_4$ = 18.5 | | | |
| D | $R_7$ = ∞ | $t_4$ = 22.0 | $S_5$ = 10.5 | 1.700 | 48.0 | $F_D$ = +165.54 |
| | $R_8$ = −115.88 | | | | | |
| E | $R_9$ = −129.42 | $t_5$ = 9.5 | $S_6$ = {939.5 at .95X, 812.1 at .70X, 684.6 at .45X} | 1.617 | 38.5 | $F_E$ = −559.66 |
| | $R_{10}$ = −212.81 | | | | | |

NATHAN RICKLESS
PAUL L. RUBEN
*INVENTORS*

BY  *Frank C. Parker*

ATTORNEY 3,133,983
SYMMETRICAL TYPE OF PROJECTION
OBJECTIVE
Nathan Rickless, Brighton, and Paul L. Ruben, Rochester, N.Y., assignors to Bausch & Lomb Incorporated, Rochester, N.Y., a corporation of New York
Filed June 27, 1962, Ser. No. 205,577
9 Claims. (Cl. 88—57)

This invention relates to a projection objective of the symmetrical type which is used for copying or process operations and more particularly relates to improvements therein.

It is an object of this invention to provide a novel symmetrical type of projection objective which is capable of high-grade image forming performance at unequal conjugates in a magnification range of .45× to 1.0×, and having a relative aperture of $f/8.0$ with respect to the infinite conjugate position thereof, as well as a comparatively large field of 35° total.

It is a further object to provide such a device which is simple and of low-cost construction considering the superior quality of optical performance for which it is designed, the objective being well corrected for chromatic and spherical aberrations, astigmatism, coma, distortion and flatness of field when the conjugates are unequal to the extent above specified.

A still further object is to provide such an objective which is so constructed and arranged as to transmit radiant energy in the wave lengths between 440 mu and 580 mu with a peak sensitivity at 500 mu.

Further objects and advantages of this invention reside in the specific details of construction and arrangement of parts as described in the specification herebelow and shown in the accompanying drawing, wherein:

FIG. 1 is an optical diagram of a preferred form of a projection objective constructed according to the present invention; and FIG. 2 is a chart of constructional data which are related to the diagram shown in FIG. 1.

A preferred form of projection objective as above outlined is indicated generally by the numeral 10 in the drawing, and said objective comprises a central diaphragm which lies adjacent to a central negative lens C. At either side of the central lens C are located symmetrically a pair of positive lenses B and D, and outwardly of said positive lenses are located an outer pair of negative meniscus lenses A and E.

The above-named lenses A, B, C, D and E are all singlet lenses and are so constructed as to cooperatively produce a superior image I of an object O by means of advantageous constructional features, in spite of the fact that the objective 10 has a large total field angle of substantially 35° and works at unequal conjugates which has a ratio of substantially .45× to 1.0× at least magnification and 1.0 to 1.0 at greatest magnification.

One of the constructional features which produces the aforementioned advantageous performance is due to the choice of focal lengths of the respective lenses, the focal length of each lens A and E being substantially $-1.095F$, where F designates the equivalent focal length of said objective 10. Likewise, the focal length of each of the positive lenses B and D is substantially $+.323F$, and the focal length of the central lens C is substantially $-.270F$.

As a further specification of the optical parameters of the objective 10, the axial air spaces between either of the meniscus lenses A and E and its adjacent positive lens B and D lies between .0185F and .0226F, the axial distance between the inner faces of said positive lenses B and D and the adjacent face of said central lens C being substantially between .0327F and .0399F.

As further specified, the constructional data are given with reference to the radii of the successive lens surfaces which are consecutively numbered $R_1$ to $R_{10}$ and are specified in the table of mathematical statements given herebelow:

$.374F < R_1 = -R_{10} < .458F$
$.229F < R_2 = -R_9 < .279F$
$.204F < R_3 = -R_8 < .250F$
$R_4 = R_7 > \pm F$
$.296F < -R_5 = R_6 < .362F$

The successive lens thicknesses $t_1$ to $t_5$ related to the successive lenses A, B, C, D, E are specified in the table of mathematical statements given herebelow:

$.0167F < t_1 = t_5 < .0205F$
$.039F < t_2 = t_4 < .048F$
$.00864F < t_3 < .01056F$

Furthermore, the specification for the interlens air spaces $S_2$ to $C_5$ are specified in the table of mathematical statements given herebelow:

$.0185F < S_2 = S_5 < .0226F$
$.0327F < S_3 = S_4 < .0399F$

As a further detailed specification of the refractive lens surface values, the refractive lens surfaces $R_1$, $R_2$, $R_9$ and $R_{10}$ which are related to the lenses A and E, respectively, may be specified along with the values of radius for the refractive surfaces $R_5$ and $R_6$ which are related to central lens C, said relationship being stated in the mathematical expression given herebelow:

$$1.56 < \frac{R_1}{R_2} = \frac{-R_{10}}{-R_9} < 1.73$$
$$-R_5 = R_6$$

The minus (—) sign designates those refractive surfaces of the lens members which are curved toward the entrant rays.

In the preferred form of the invention, the plane of the diaphragm is located at an axial distance $d$ away from the adjacent surface of the central lens C between .00618F and .00716F.

For effective refraction of radiant energy in the spectral range between 440 mu and 580 mu, the values of refractive index which are designated $n_D$ and the Abbe numbers which are designated $\nu$ are given in the table of ranges in the mathematical statements given herebelow:

$1.610 < n_D(I) = n_D(V) < 1.625$
$1.690 < n_D(II) = n_D(IV) < 1.725$
$1.600 < n_D(III) < 1.610$
$33.0 < \nu(I) = \nu(V) < 43.0$
$43.0 < \nu(II) = \nu(IV) < 53.0$
$33.0 < \nu(III) < 43.0$

Specifically, certain of the above-mentioned constructional data are given herebelow in the tables of values which are related to one successful form of this invention as follows:

$R_1 = -R_{10} = .416F$     $t_2 = t_4 = .0433F$
$R_2 = -R_9 = .254F$     $t_3 = .0096F$
$R_3 = -R_8 = .227F$
$R_4 = R_7 = \infty$     $S_2 = S_5 = .0206F$
$-R_5 = R_6 = .328F$     $S_3 = S_4 = .0363F$
$t_1 = t_5 = .0186F$ As a further specification of the optical parameters of the objective 10, the front conjugate $S_1$ between the object and lens A has values as stated in the equations herebelow, and the rear conjugate $S_6$ extending between lens E and the image plane I has values as stated herebelow for different specific magnifications, namely, .45× and .95×:

$S_1 = 3.115F$ at .45× magnification
$S_1 = 3.115F$ at .95× magnification
$S_6 = 1.343F$ at .45× magnification
$S_6 = 1.84F$ at .95× magnification Stated in another manner, said specific constructional data for the objective 10 are given in the chart of values herebelow in accordance with FIG. 2 of the drawing, the symbols thereof having the same meaning as given heretofore in the specification,

[F.L.=20″=509.9 mm.   f/8.0]

| Lens | Radii | Thicknesses | Spacings | $n_D$ | $\nu$ | Focal Lengths |
|---|---|---|---|---|---|---|
| A | $R_1 = 212.81$ $R_2 = 129.42$ | $t_1 = 9.5$ | $S_1 = \begin{cases} 991.9 \text{ at } 95\times \\ 1,183.6 \text{ at } 70\times \\ 1,588.3 \text{ at } 45\times \end{cases}$ $S_2 = 10.5$ | 1.617 | 38.5 | $F_A = -559.66$ |
| B | $R_3 = 115.88$ $R_4 = \infty$ | $t_2 = 22.0$ | $S_3 = 18.5$  $d=3.5$ | 1.700 | 48.0 | $F_B = +165.54$ |
| C | $R_5 = -167.49$ $R_6 = +167.49$ | $t_3 = 4.9$ | $S_4 = 18.5$ | 1.605 | 38.0 | $F_C = -137.66$ |
| D | $R_7 = \infty$ $R_8 = -115.88$ | $t_4 = 22.0$ | $S_5 = 10.5$ | 1.700 | 48.0 | $F_D = +165.54$ |
| E | $R_9 = -129.42$ $R_{10} = -212.81$ | $t_5 = 9.5$ | $S_6 = \begin{cases} 939.5 \text{ at } 95\times \\ 812.1 \text{ at } 70\times \\ 684.6 \text{ at } 45\times \end{cases}$ | 1.617 | 38.5 | $F_E = -559.66$ |

All scalar quantities given in millimeters, and the lens radii which curve toward the entrant rays are designated by the minus sign.

For effecting all permissible economies in the manufacture of the objective 10, the lens surfaces $R_1$ to $R_{10}$ are provided with the flattest curvatures which are feasible and in fact $R_4$ and $R_7$ are plano surfaces.

Although only a single form of the present invention is shown and described in detail, it will be understood that other forms are possible and changes may be made in the detailed values of the constructional data and minor features without departing from the spirit of the invention as set forth in the claims here appended.

What is claimed is:

1. A symmetrical type of projection objective for copy and process operations working at unequal conjugates within a range of magnifications between .40× and 1.0×, said objective comprising five singlet optically aligned lenses, said lenses being a central negative lens located adjacent to a diaphragm, a pair of positive lenses spaced at either side of said central lens and having a convex surface turned outwardly, and a pair of negative meniscus lenses spaced at either side of said positive lenses and having a concave surface turned toward the central lens, the focal length of each of the negative meniscus lenses being substantially −1.095F, the focal length of each of the positive lenses being substantially +.323F, the focal length of said central lens being substantially −.270F, the axial air spaces between either meniscus lens and its adjacent positive lens being between .0185F and .0226F, and the axial distance between the inner faces of said positive lenses and the adjacent face of said central lens being substantially between .0327F and .0399F, wherein F represents the equivalent focal length of said objective.

2. A symmetrical type of projection objective for copy and process operations working at unequal conjugates within a range of magnifications between .40× and 1.0× and a total field angle of substantially 35°, said objective comprising five singlet optically aligned lenses, said lenses being a central negative lens located adjacent to a diaphragm, a pair of positive lenses spaced at either side of said central lens and having a convex surface turned outwardly, and a pair of negative meniscus lenses spaced at either side of said positive lenses and having a concave surface turned toward the central lens, the radii of the successive lens surfaces $R_1$ to $R_{10}$ being specified in the table of mathematical statements given herebelow, $.374F < R_1 = -R_{10} < .458F$
   $.229F < R_2 = -R_9 < .279F$
   $.204F < R_3 = -R_8 < .250F$
   $R_4 = R_7 > \pm F$
   $.296F < -R_5 = R_6 < .362F$ wherein the minus (−) sign designates lens surfaces which curve toward the entrant rays, the successive lens thicknesses $t_1$ to $t_5$ being specified in the table of mathematical statements given herebelow, $.0167F < t_1 = t_5 < .0205F$
   $.039F < t_2 = t_4 < .048F$
   $.00864F < t_3 < .01056F$ wherein F represents the equivalent focal length of said objective, and the successive lens spacings $S_2$ to $S_5$ are specified in the table of mathematical statements given herebelow, $.0185F < S_2 = S_5 < .0226F$
   $.0327F < S_3 = S_4 < .0399F$ 3. A projection objective as set forth in claim 1 further characterized by the successive lens thicknesses $t_1$ to $t_5$ being specified in the table of mathematical statements given below, $.0167F < t_1 = t_5 < .0205F$
   $.039F < t_2 = t_4 < .048F$
   $.00864F < t_3 < .01056F$ 4. A projection objective as set forth in claim 2, said objective being further characterized by the axial distance between the plane of said diaphragm and the adjacent surface of the central lens being between .00618F and .00756F.

5. A projection objective for transmitting radiant energy in the wave lengths between 440 mu and 580 mu as set forth in claim 2 further characterized by the values of refractive index $n_D(I)$ to $n_D(V)$ and Abbe numbers $\nu(I)$ to $\nu(V)$ related to the successive lenses being as given in the mathematical statements given herebelow, $$1.610 < n_D(I) = n_D(V) < 1.625$$
$$1.690 < n_D(II) = n_D(IV) < 1.725$$
$$1.600 < n_D(III) < 1.610$$
$$33.0 < \nu(I) = \nu(V) < 43.0$$
$$43.0 < \nu(II) = \nu(IV) < 53.0$$
$$33.0 < \nu(III) < 43.0$$

6. A projection objective as set forth in claim 1 further characterized by the mathematical relationship between the refractive lens surfaces $R_1$, $R_2$, $R_9$ and $R_{10}$ of the meniscus lenses and the lens surfaces $R_5$ and $R_6$ of said central lens being as given in the mathematical expressions herebelow, $$1.56 < \frac{R_1}{R_2} = \frac{-R_{10}}{-R_9} < 1.73$$
$$-R_5 = R_6$$

where the minus (—) sign designates lens surfaces which curve toward the entrant rays.

7. A projection objective as set forth in claim 1 further characterized by the mathematical relationship between the refractive lens surfaces $R_1$, $R_2$, $R_9$ and $R_{10}$ of the meniscus lenses and the lens surfaces $R_5$ and $R_6$ of said central lens being as given in the mathematical expression herebelow, the values of the successive lens radii $R_1$ to $R_{10}$ of the successive lenses I to V, the thicknesses $t_1$ to $t_5$ of said lenses, the axial air spaces $S_2$ to $S_5$ between the lenses, and the refractive index $n_D$ and Abbe number $\nu$ of the lens glasses being as stated in the table of mathematical expressions herebelow, $$R_1 = -R_{10} = .416F$$
$$R_2 = -R_9 = .254F$$
$$R_3 = -R_8 = .227F$$
$$R_4 = R_7 = \infty$$
$$-R_5 = R_6 = .328F$$

$$t_1 = t_5 = .0186F$$
$$t_2 = t_4 = .0433F$$
$$t_3 = .0096F$$

$$S_2 = S_5 = .0206F$$
$$S_3 = S_4 = .0363F$$

wherein F represents the equivalent focal length of the objective, and the minus (—) sign designates lens surfaces which curve toward the entrant rays.

8. A symmetrical type of projection objective as set forth in claim 7 wherein the front conjugate has a value of 3.115F at 45× magnification and a value of 1.94F at 95× magnification, the rear conjugate having a value of 1.343F at 45× magnification and a value of 1.84F at 95× magnification.

9. A symmetrical type of projection objective for copy and process operations working at unequal conjugates within a range of magnifications between .40× and 1.0×, said objective comprising five singlet optical aligned lenses, said lenses being a central negative lens located adjacent to a diaphragm, a pair of positive lenses spaced at either side of said central lens and having a convex surface turned outwardly, and a pair of negative meniscus lenses spaced at either side of said positive lenses and having a concave surface turned toward the central lens, the constructional data relative to the lens radii $R_1$ to $R_{10}$, the lens thicknesses $t_1$ to $t_5$, lens spacings existing between the object and image $S_1$ to $S_6$, the focal lengths $F_A$ to $F_E$ of the successive aforesaid lenses, and refractive index $n_D$ and Abbe number $\nu$ in the optical materials from which said lenses are made being given in the table herebelow,

[F.L.=20″=509.9 mm.  f/8.0]

| Lens | Radii | Thicknesses | Spacings | $n_D$ | $\nu$ | Focal Lengths |
|---|---|---|---|---|---|---|
| | | | $S_1 = \begin{cases} 991.9 \text{ at } 95\times \\ 1,183.6 \text{ at } 70\times \\ 1,588.3 \text{ at } 45\times \end{cases}$ | | | |
| A | $R_1 = 212.81$ | $t_1 = 9.5$ | | 1.617 | 38.5 | $F_A = -559.66$ |
| | $R_2 = 129.42$ | | | | | |
| | | | $S_2 = 10.5$ | | | |
| B | $R_3 = 115.88$ | $t_2 = 22.0$ | | 1.700 | 48.0 | $F_B = +165.54$ |
| | $R_4 = \infty$ | | | | | |
| | | | $S_3 = 18.5 \quad d = 3.5$ | | | |
| C | $R_5 = -167.49$ | $t_3 = 4.9$ | | 1.605 | 38.0 | $F_C = -137.66$ |
| | $R_6 = +167.49$ | | | | | |
| | $R_7 = \infty$ | | $S_4 = 18.5$ | | | |
| D | $R_8 = -115.88$ | $t_4 = 22.0$ | | 1.700 | 48.0 | $F_D = +165.54$ |
| | | | $S_5 = 10.5$ | | | |
| E | $R_9 = -129.42$ | $t_5 = 9.5$ | | 1.617 | 38.5 | $F_E = -559.66$ |
| | $R_{10} = -212.81$ | | | | | |
| | | | $S_6 = \begin{cases} 939.5 \text{ at } 95\times \\ 812.1 \text{ at } 70\times \\ 684.6 \text{ at } 45\times \end{cases}$ | | | |

All scalar quantities given in millimeters, and the lens radii which curve toward the entrant rays are designated by the minus (—) sign.

No references cited.

UNITED STATES PATENT OFFICE
CERTIFICATE OF CORRECTION

Patent No. 3,133,983

May 19, 1964

Nathan Rickless et al.

It is hereby certified that error appears in the above numbered patent requiring correction and that the said Letters Patent should read as corrected below.

Column 1, line 54, for "has" read -- have --; column 2, line 19, for "$C_5$" read -- $S_5$ --; column 3, line 4, for "3.115F" read -- 1.94F --.

Signed and sealed this 29th day of September 1964.

(SEAL)
Attest:

ERNEST W. SWIDER
Attesting Officer

EDWARD J. BRENNER
Commissioner of Patents